(12) United States Patent
Cheesman et al.

(10) Patent No.: US 9,926,404 B2
(45) Date of Patent: Mar. 27, 2018

(54) CURING COMPOSITIONS

(71) Applicant: AQDOT LIMITED, Pampisford, Cambridge (GB)

(72) Inventors: Ben Cheesman, Cambridge (GB); Roger Coulston, Cambridge (GB); Rosemary Lynch, Cambridge (GB); Matthew Rowland, Cambridge (GB); David Diec, Cambridge (GB)

(73) Assignee: AQDOT LIMITED, Cambridge (GB)

( * ) Notice: Subject to any disclaimer, the term of this patent is extended or adjusted under 35 U.S.C. 154(b) by 70 days.

(21) Appl. No.: 15/158,058

(22) Filed: May 18, 2016

(65) Prior Publication Data
US 2016/0340467 A1 Nov. 24, 2016

(30) Foreign Application Priority Data

May 18, 2015 (GB) .................... 1508510.3

(51) Int. Cl.
*C08G 59/18* (2006.01)
*C08G 83/00* (2006.01)
*C08G 59/50* (2006.01)
*C08G 59/24* (2006.01)

(52) U.S. Cl.
CPC ......... *C08G 59/188* (2013.01); *C08G 59/245* (2013.01); *C08G 59/5006* (2013.01); *C08G 59/5033* (2013.01); *C08G 59/5073* (2013.01); *C08G 83/008* (2013.01)

(58) Field of Classification Search
CPC C08G 59/188; C08G 83/008; C08G 59/5006; C08G 59/245; C08G 59/5033; C08G 59/5073
USPC .......................................................... 528/94
See application file for complete search history.

(56) References Cited

U.S. PATENT DOCUMENTS

| 3,395,105 A | 7/1968 | McDonnell |
| 4,711,936 A | 12/1987 | Shibanai et al. |
| 6,147,169 A * | 11/2000 | Ohnishi ............ C08G 59/18 525/403 |
| 2004/0039195 A1 | 2/2004 | Kim et al. |
| 2007/0066818 A1 | 3/2007 | Day et al. |
| 2013/0158166 A1 | 6/2013 | Lin |
| 2015/0297772 A1 | 10/2015 | Kim et al. |

FOREIGN PATENT DOCUMENTS

| EP | 1602678 A1 | 12/2005 |
| KR | 2014-0063372 A | 5/2014 |
| WO | 01/046290 A1 | 6/2001 |
| WO | 2009/071899 A2 | 6/2009 |
| WO | 2013/014452 A1 | 1/2013 |

OTHER PUBLICATIONS

Nov. 18, 2015 Search Report issued in British Patent Application No. 1508510.3.
Jul. 28, 2016 Search Report issued in European Patent Application No. 16170228.7.
Lagona et al, "The Cucurbit[n]uril Family," Angewandte Chemie International Edition, Wiley-VCH Verlag GMBH & Co. KGaA, vol. 44, No. 31, pp. 4844-4870, 2005.

* cited by examiner

*Primary Examiner* — David T Karst
(74) *Attorney, Agent, or Firm* — Oliff PLC

(57) ABSTRACT

Epoxy compositions include a cucurbituril in complex with a curative, and methods for curing the epoxy composition. The curative is reactive with an epoxy compound, and the curative may be a cure accelerator or a cure hardener. Cured resins are obtained or obtainable from the epoxy compositions. Complexes of a cucurbituril have a curative.

20 Claims, No Drawings

CURING COMPOSITIONS

FIELD OF THE INVENTION

This invention relates to epoxy compositions comprising a cucurbituril in complex with a curative, and methods for curing the epoxy compositions. The invention also provides cured resins obtained or obtainable from the epoxy compositions. Also provided are complexes of a cucurbituril with a curative.

BACKGROUND

Epoxy resins are widely used as a commercial adhesive where its use can be found in industrial and electrical applications, consumer applications, marine and aerospace applications. The strong bonding property is due to the three-dimensional cross-linked polymeric network formed during curing of the epoxy, usually by reaction between a curing agent and the epoxy groups to obtain a desirable cross-linking density. Curing catalysts can also be added to the mixture to further accelerate the cure (cure accelerator).

Traditionally the epoxy resin and curative are either stored separately until the time of reaction or stored in refrigeration after mixing to prevent undesirable premature curing of the resin. This, however, is inconvenient and energy consuming. It also does not resolve the dilemma of increased cure rate at the expense of storage life.

One solution to this problem is the use of latent, or in-situ generated, curatives. These are chemical species that are stored in a shielded or inert form during storage conditions and that do not initiate or catalyse the epoxy reaction in the composition until some stimulus, typically temperature, is applied to generate the active form. Using this strategy, a one-part, ambient-temperature-stable curable epoxy resin can be achieved with fast curing rate when desired without sacrificing storage life of the epoxy composition.

For example, U.S. Pat. No. 3,395,105 describes a curative encapsulated in a hardened protective colloid such as gelatin and while it is stable for storage at ambient temperature, the curing agent can be released by application of pressure for reaction with the epoxy resin.

EP 1,252,217 describes the use of ambient-temperature-stable, impermeable microcapsules with thermoplastic polymeric capsule walls to encapsulate curatives to generate storage-stable, one-part, curable epoxy resin systems, and the method of curing the adhesive by heating the system at 80° C. or above.

U.S. Pat. No. 4,711,936 describes the use of a complex formed between a cyclodextrin and a compound that is reactive with an epoxy group as a curing agent for an epoxy resin at room temperature and the method of curing epoxy resin by heating the mixture of the curing agent and the epoxy resin at 90° C. causing the complex to decompose.

U.S. Pat. No. 4,711,936 does not provide a detailed description of the complex prepared. It is noted that the coating compositions used in the worked examples make use of toluene. This solvent is known to be a guest for a cyclodextrin, and there is the risk that the curative is displaced by toluene prior to the heat treatment.

U.S. Pat. No. 4,711,936 shows that one example composition may be stored for up 3 days. However, there are no examples of compositions that are stored over a longer, commercially relevant time frame. The worked examples show that temperatures of greater than 100° C. are needed, and with the exception of one worked example, all the example compositions are heated to temperatures of 120° C. or more.

U.S. Pat. No. 4,711,936 suggests that lower decomplexation temperatures are possible, for example, at around 40° C. However this requires the use of the enzyme amylase to digest the cyclodextrin host, which complicates the curing process.

The present invention provides alternative epoxy compositions for use in the preparation of cured epoxy resins. Such compositions allow for activation of a curing composition at a broad range of temperatures, including moderate temperatures, and without the need for the use of enzymes.

SUMMARY OF THE INVENTION

The present invention generally provides a cucurbituril in complex with a curative for an epoxy composition. The curative is reactive with an epoxy compound, and the curative may be a cure accelerator or a cure hardener. The complex may be provided together with an epoxy compound in an epoxy composition.

The epoxy compositions have excellent stability, and may be stored at ambient temperatures without risk of curing. The epoxy composition may be cured by decomplexing the curative from the cucurbituril, and allowing the curative to react with the epoxy compound. The decomplexation step may be performed at relatively low temperatures, such as about 60° C., with concomitant curing of the composition, with or without a decomplexing agent. The compositions of the invention have long term stability and may be stored for greater than 12 days without noticeable curing of the composition.

It has also been established that it is not necessary to provide all the curative in a complex. Some of the curative present in the composition may not be in complex with cucurbituril. For example up to 25 mole %, up to 50 mole %, or up to 75 mole % of the curative may not be complexed. A composition containing uncomplexed curative is nevertheless stable, and there is no noticeable curing of the composition at ambient temperatures.

In one aspect of the invention there is provided an epoxy composition comprising:
  (i) an epoxy compound; and
  (ii) a complex of a cucurbituril with a curative;
wherein the curative is reactive with the epoxy compound to form a cured epoxy product. In one embodiment, the curative is a cure accelerator or a cure hardener.

In one embodiment, the composition comprises a cure accelerator and a cure hardener, wherein one or both is provided in complex with the cucurbituril, either within the same complex or in separate complexes.

In one embodiment, the epoxy composition is an epoxy adhesive composition.

In a second aspect of the invention there is provided a method of curing a curable epoxy composition according to the first aspect of the invention, the method comprising the steps of releasing the curative from the complex with the cucurbituril, and permitting the curative to react with the epoxy compound thereby to from a cured resin product.

In one embodiment, the curative is released from the complex by heating the complex at a temperature of at least 50° C., such as at least 55° C., or at least 60° C.

The curative may react with the epoxy compound at these temperatures.

In a third aspect of the invention there is provided a cured resin product obtained or obtainable from the method of the second aspect of the invention. The cured product comprises cucurbituril.

In a fourth aspect of the invention there is provided a complex of a cucurbituril with a curative. In one embodiment, the complex is provided in the absence of solvent, such as in the absence of water.

In a fifth aspect of the invention there is provided a method for the preparation of a complex according to the fourth aspect of the invention, the method comprising the step of mixing a cucurbituril with a curative, thereby to form a complex of the cucurbituril with the curative.

In one embodiment the complex is prepared by mixing the cucurbituril with curative in the absence of solvent.

In one embodiment the complex is prepared by dry mixing the cucurbituril with the curative.

In a sixth aspect of the invention there is provided a method for the preparation of a curable epoxy composition, the method comprising the step of mixing a complex according to the fourth aspect of the invention with an epoxy compound.

In one embodiment the method further comprises the step of adding a decomplexing agent to the epoxy composition.

In a seventh aspect of the invention there is provided a kit comprising an epoxy composition according to the first aspect of the invention and a decomplexing agent, wherein the epoxy composition and decomplexing agent are contained in separate containers.

These and other aspects and embodiment of the invention are described in further detail below.

DETAILED DESCRIPTION OF THE INVENTION

The present inventors have found that cucurbituril compounds may be used to hold within a non-covalent complex a curative for a polymerizable epoxy compound. The complex prevents the reaction of the curative, and when the complex is provided with an epoxy compound in a composition there is no noticeable polymerisation of the epoxy compound. The curative may be released from the complex and made available for reaction with the epoxy compound, thereby to form a cured epoxy product.

It follows that the reagents for the preparation of the cured epoxy product may be provided together in a composition, and the reaction of these reagents may be prevented by the presence of the curative complexed with cucurbituril. The composition may be stored until required without premature polymerisation. Such a composition avoids the need to separately provide the reagents for the preparation of the cured epoxy product.

Furthermore, the complexation of the curative with a cucurbituril reduces the volatility of the curative, which improves the storage properties of the composition, as component losses through evaporation are minimised. For example, the complexation of volatile amines is advantageous from a health and safety aspect since complexation can covert liquid amines into a powder form.

Cucurbituril complexes are well known and the complexes may be easily prepared from cucurbituril and the required catalyst or curing agent. The decomplexation of the complex, to make the curative available for reaction, is straightforward, typically proceeding at moderate temperatures with subsequent curing of the composition.

Cucurbituril

The present invention provides the use of a cucurbituril to form a complex with a curative.

Cucurbituril is a member of the cavitand family, and the general cucurbituril structure is based on the cyclic arrangement of glycoluril subunits linked by methylene bridges.

The preparation and purification of cucurbituril compounds is well described in the art. For example, Lagona et al. review the synthesis and properties of cucurbituril compounds, including derivatives, analogues and congener within the cucurbituril family.

Cucurbiturils are capable of forming stable, yet dynamic complexes with guest compounds in water with much higher affinity and higher selectivity compared to other host molecules, such as cyclodextrin. Such complexation can also be reversed by the application of a number of stimuli, including but not limited to heat, light and competitive agent. These properties make cucurbiturils well suited for the complexation with and the release of curing agents and catalysts.

For example, cucurbit[8]uril (CB[8]; CAS 259886-51-6) is a barrel shaped container molecule which has eight repeat glycoluril units and an internal cavity size of 479$A^3$ (see structure below). CB[8] is readily synthesised using standard techniques and is available commercially (e.g. Sigma-Aldrich, MO USA).

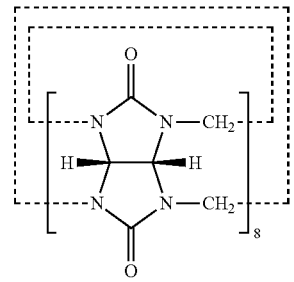

In one embodiment, the cucurbituril is a CB[5], CB[6], CB[7], CB[8], CB[9], CB[10], CB[11], CB[12], CB[13] or CB[14] compound.

In one embodiment, the cucurbituril is a CB[5], CB[6], CB[7], CB[8], CB[9], CB[10], CB[11] or CB[12] compound.

In one embodiment, the cucurbituril is a CB[5], CB[6], CB[7], or CB[8] compound.

In one embodiment, the cucurbituril is a CB[6] compound.

In one embodiment, the cucurbituril is a CB[7] compound.

In one embodiment, the cucurbituril is a CB[8] compound.

The epoxy compositions of the invention may include a single analogue of cucurbituril, or may alternatively include two or more cucurbituril selected from the group consisting of CB[5], CB[6], CB[7], CB[8], CB[9], CB[10], CB[11], CB[12], CB[13] and CB[14]. A mixture of two or more different cucurbituril is defined as CB[n]. The epoxy composition may comprise a mixture of CB[6] and CB[8].

In one embodiment, the cucurbituril in the epoxy composition is CB[n].

A variant of cucurbituril may include a structure having one or more repeat units that are structurally analogous to glycoluril. The repeat unit may include an ethylurea unit. Where all the units are ethylurea units, the variant is a hemicucurbituril. The variant may be a hemicucurbit[12]uril (shown below, see also Lagona et al.).

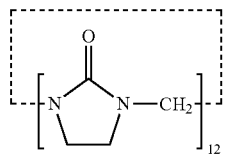

In other aspects of the invention, cucurbituril derivatives are provided and find use in the methods described herein. A derivative of a cucurbituril is a structure having one, two, three, four or more substituted glycoluril units. A substituted cucurbituril compound may be represented by the structure below:

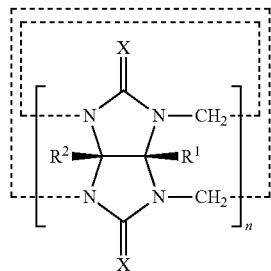

wherein:
n is an integer of at least 5;
and for each glycoluril unit:
each X is O, S or $NR^3$, and
—$R^1$ and —$R^2$ are each independently selected from —H and the following optionally substituted groups: —$R^3$, —OH, —$OR^3$, —COOH, —$COOR^3$, —$NH_2$, —$NHR^3$ and —$N(R^3)_2$ where —$R^3$ is independently selected from $C_{1-20}$alkyl, $C_{6-20}$carboaryl, and $C_{5-20}$heteroaryl, or where —$R^1$ and/or —$R^2$ is —$N(R^3)_2$, both —$R^3$ together form a $C_{5-7}$ heterocyclic ring; or together —$R^1$ and —$R^2$ are $C_{4-6}$alkylene forming a $C_{6-8}$carbocyclic ring together with the uracil frame.

In one embodiment, one of the glycoluril units is a substituted glycoluril unit. Thus, —$R^1$ and —$R^2$ are each independently —H for n−1 of the glycoluril units In one embodiment, n is 5, 6, 7, 8, 9, 10, 11, 12, 13 or 14.
In one embodiment, n is 5, 6, 7, 8, 9, 10, 11 or 12.
In one embodiment, n is 5, 6, 7, 8, 10, 12 or 14.
In one embodiment, n is 5, 6, 7, 8, 10 or 12.
In one embodiment, n is 5, 6, 7 or 8.
In one embodiment, n is 6.
In one embodiment, n is 7.
In one embodiment, n is 8.
In one embodiment, each X is O.
In one embodiment, each X is S.
In one embodiment, $R^1$ and $R^2$ are each independently H.
In one embodiment, for each unit one of $R^1$ and $R^2$ is H and the other is independently selected from —H and the following optionally substituted groups: —$R^3$, —OH, —$OR^3$, —COOH, —$COOR^3$, —$NH_2$, —$NHR^3$ and —$N(R^3)_2$. In one embodiment, for one unit one of $R^1$ and $R^2$ is H and the other is independently selected from —H and the following optionally substituted groups: —$R^3$, —OH, —$OR^3$, —COOH, —$COOR^3$, —$NH_2$, —$NHR^3$ and —$N(R^3)_2$. In this embodiment, the remaining glycoluril units are such that $R^1$ and $R^2$ are each independently H.

Preferably —$R^3$ is $C_{1-20}$alkyl, most preferably $C_{1-6}$alkyl. The $C_{1-20}$alkyl group may be linear and/or saturated. Each group —$R^3$ may be independently unsubstituted or substituted. Preferred substituents are selected from: —$R^4$, —OH, —$OR^4$, —SH, —$SR^4$, —COOH, —$COOR^4$, —$NH_2$, —$NHR^4$ and —$N(R^4)_2$, wherein —$R^4$ is selected from $C_{1-20}$alkyl, $C_{6-20}$carboaryl, and $C_{5-20}$heteroaryl. The substituents may be independently selected from —COOH and —$COOR^4$.

In some embodiments, —$R^4$ is not the same as —$R^3$. In some embodiments, —$R^4$ is preferably unsubstituted.

Where —$R^1$ and/or —$R^2$ is —$OR^3$, —$NHR^3$ or —$N(R^3)_2$, then —$R^3$ is preferably $C_{1-6}$alkyl. In some embodiments, —$R^3$ is substituted with a substituent —$OR^4$, —$NHR^4$ or —$N(R^4)_2$. Each —$R^4$ is $C_{1-6}$alkyl and is itself preferably substituted.

In some embodiments of the invention there is provided the use of a plurality of covalently linked cucurbiturils. Such covalently linked cucurbiturils are suitable for forming networks based on the complexation of the cucurbituril with guest molecules of a building block. The complexes formed may be ternary or binary complexes. Ternary and binary complexes are described in more detail in WO2009/071899 and WO2013014452, the contents of which are hereby incorporated by reference.

A cucurbituril may be covalently linked to another component in the epoxy composition, such as cucurbituril, via a linker group that is a substituent at position $R^1$ or $R^2$ at one of the glycoluril units in the cucurbituril as represented in the structure shown above. There are no particular limitations on the covalent link between the cucurbiturils. The linker may be in the form of a simple alkylene group, a polyoxyalkylene group or a polymer, such as a polymeric molecule described herein for use in the building block. Where the linker is a polymeric molecule, the cucurbiturils may be pendant to that polymer.

In one embodiment, $R^1$ and $R^2$ each represent —OH. The —OH reactive group can covalently link to other components in the epoxy composition, for example, to other cucurbituril, to form a network.

The cucurbituril may be used to form binary or ternary complexes with the catalyst and/or curing agent. This is described in further detail below with respect to the complex.

In one embodiment, the cucurbituril is capable of forming a ternary complex. For example, CB[8], is capable of forming a ternary complex.

In one embodiment, the cucurbituril is capable of forming a binary complex. For example, CB[7] and CB[6], are capable of forming a binary complex. CB[8] may also form a binary complex.

In one embodiment, the cucurbituril is capable of forming ternary and binary complexes.

For example, CB[8], is capable of forming a ternary or a binary complex, depending upon the nature of the guest.

The epoxy compositions of the invention may comprise a mixture of ternary and binary complexes. Alternatively, the epoxy compositions may comprise only ternary complexes or only binary complexes. For example, in the aspect of the invention where the composition comprises a complexed curing agent and a complexed catalyst, the curing agent and catalyst may be within the same complex or in separate complexes.

In one embodiment, references to a cucurbituril compound are references to variants and derivatives thereof.

A cucurbituril compound may be selected based on the curative for use in the epoxy composition.

Curative

The curative for use in the present invention is reactive with the epoxy compound to form a cured epoxy product. The reaction of the curative is prevented when the catalyst or curing agent is held in a complex with cucurbituril. A cure hardener is an example of a curing agent. The terms "cure hardener" and "hardening agent" are used interchangeably throughout. The terms "catalyst" and "cure accelerator" may be used interchangeably throughout.

The curative may be a catalyst, which may also be referred to as a cure accelerator, for promoting the cure of the composition. The cure accelerator is provided to accelerate the rate of curing and may be used in combination with a hardening agent to accelerate the activity of that agent. For example, EP 1,602,678 describes the use of sulfonamide compounds as cure accelerators for imidazole curing agents. EP 1,252,217 describes the use of metal imidazolate compounds as cure accelerators for use with a cure hardener.

Further examples of catalysts for the cure of an epoxy compound include sulfonamides, benzamides and/or aromatic acid hydrazides. Examples include those described in EP 1,602,678.

Suitable sulfonamides include N-methyl toluenesulfonamide, N-ethyl toluenesulfonamide, N-propyl toluenesulfonamide, N-butyl toluenesulfonamide, N-hexyl toluenesulfonamide, N-octyl toluenesulfonamide, N-cyclohexyl toluenesulfonamide, 4-methyl benzenesulfonamide, methanesulfonamide, benzenesulfonamide, N-butylbenzenesulfonamide, p-chlorobenzenesulfonamide, o-toluenesulfonamide, p-toluenesulfonamide, and bis(hydroxyethyl) toluenesulfonamide. For example, suitable sulfonamides include N-methyl toluenesulfonamide, N-ethyl toluenesulfonamide, methanesulfonamide, benzenesulfonamide, N-butylbenzenesulfonamide, p-chlorobenzenesulfonamide, o-toluenesulfonamide, p-toluenesulfonamide, and bis(hydroxyethyl)toluenesulfonamide. Monofunctional and difunctional (disulfonamides) may be used, although monofunctional are preferred. A sulfonamide may be use together with another sulfonamide catalyst.

Suitable benzamides, include N-methyl benzamide and N-methyl toluamide, which may be used alone or in combination.

Suitable aromatic acid hydrazides, include benzoic hydrazide, p-toluic hydrazide, m-toluic hydrazide, m-anisic hydrazide, 2-chlorobenzoic hydrazide, 2-nitrobenzoic hydrazide, 2-furoic hydrazide, 1-naphthoic hydrazide and isophtalohydrazide. For example, suitable aromatic acid hydrazides, include benzoic hydrazide, p-toluic hydrazide, m-toluic hydrazide, m-anisic hydrazide, 2-chlorobenzoic hydrazide, 2-nitrobenzoic hydrazide, 2-furoic hydrazide and 1-naphthoic hydrazide. Monofunctional and difunctional (dihydrazides) may be used, although monofunctional are preferred. A hydrazide may be used together with another hydrazide catalyst.

Further example catalysts are those described in US 2013/0158166 and includes benzylamine compounds and quaternary ammonium bicarbonate compounds.

For example, the benzylamine compound may be a benzyldialkylamine, such as benzyldimethylamine.

The benzylamine compound may be a benzylamine quaternary salt, such as a benzyl trialkylammonium salt.

The catalyst may be a quaternary ammonium bicarbonate of the type $R_1R_2R_3R_4N^+HCO_3^-$, wherein each of $R_1$, $R_2$, $R_3$, and $R_4$ are independently alkyl, phenyl, alkylbenzene, hydrogen, and alkoxy, except that each of $R_1$, $R_2$, $R_3$, and $R_4$ is not hydrogen.

A cure hardener is a compound that is consumed during the cure of an epoxy compound. The cure hardener may be an initiator for the cure reaction, such as an initiator for the ring opening polymerisation of the epoxy group. The cure hardener may react to form crosslinks in the cured epoxy product. Thus, the curing agent may be used to harden the cured product, and may therefore be referred to as a hardening agent.

A curative may be used to initiate the ring opening polymerisation of the epoxy ring. Tertiary amines, imidazole and phenol compounds are particularly suitable for use as polymerization initiators.

In one embodiment, the curative is a compound having amino functionality. The amino functionality may be a primary amino functionality or may be a secondary, tertiary or quaternary amino functionality, such as a secondary, tertiary or quaternary alkyl amino functionality.

The curative may additionally possess hydroxyl functionality as well as amino functionality. For example, U.S. Pat. No. 3,395,105 describes the use of aminophenol compounds in reaction with epoxy compounds.

The curative compound may be selected from the group consisting of imidazoles (imidazole-containing compound), primary aliphatic amines, aromatic amines, anilines, cycloaliphatic amines, benzylic amines, triazoles, phenols, amidoamines and polyamides. For example, the curative may be selected from the group consisting of imidazoles (imidazole-containing compound), primary aliphatic amines, aromatic amines, anilines, cycloaliphatic amines, benzylic amines and triazoles.

In one embodiment, the curative is an imidazole-containing compound.

It is noted that a compound may have cure hardening and cure accelerating properties. Thus, a compound may be used as a cure hardener, but it may also be provided to accelerate the curing reaction in the presence of a different cure hardener. Examples of compounds which have cure hardening and cure accelerating properties are 3-(2-methyl-1H-imidazol-1-yl)propanenitrile and 2-ethyl-4-methyl-1H-imidazole-1-propanenitrile.

In one embodiment, the curative compound is a phenol or anhydride and is combined with an amine, such as an imidazole, curative which acts as an accelerator or hardener.

Where a cure hardener and a cure accelerator are provided, one or both may be provided in complex with cucurbituril, either within the same complex or in separate complexes.

In one embodiment, the curative comprises a heterocycle or a heteroaryl group, such as a nitrogen heterocycle, such as morpholine, or a nitrogen heteroaryl group, such as imidazole. In another embodiment, the curative comprises an anhydride group.

In one embodiment, the catalyst or curing agent is selected from the group consisting of triethylenediamine (TEDA), bis(dimethylaminoethyl)ether (BDMAEE), dimethylaminoethanol, dimethylaminoethyl-N-methylethanolamine, diethylaminoethoxyethanol, dimethylaminoethylmorpholine, N-ethyl-morpholine, 2-ethyl-4-methyl imidazole, 4-methyl imidazole, tris-2,4,6,-Dimethylaminomethylphenol, pentamethyldiethyltriamine, N,N-dimethylcyclohexylamine, tris-(dimethylaminopropyl)amine, dicyclohexylmethylamine, bis(dimethylamino)propylamine, dimethylaminopropyl-N-methylpropanol, tris(dimethylaminopropyl)triazine, methoxypropylmorpholine, bis(dimethylaminopropyl)methylamine, dimethylaminopropylamine, 1,8-diazabicyclo(5,4,0)undecene-7, diglycolamine, dimethylpiperazine, methoxymethylmorpholine, bis[2-(morpholine)-ethyl]ether, N,N,N",N"-tetramethyl-N'-2-hydroxypropyldiethyltriamine, N-dimethylaminoethyl-N-methylpiperazine, tetramethylethylenediamine, N,N-dimethylaminoethyl-N'N'-diemthylaminopropylether, N,N, N',N'-tetramethylbutanediamine, N-cocomorpholine, trimethylamine, N,N,N',N'-tetramethylhexanediamine, 1-(2-hydroxyethyl)-4-methylmorpholine, 1-(2-hydroxyethyl)-4-methylpiperazine, tetramethyl-2-hydroxypropyldiamine, hydroxyethylmorpholine, bis(dimethylaminopropyl)ethyleneglycolether, tetramethylguadinine, hexamethyltriethyltetraamine, dimethylaminopropylimidazole, dimethylbenzylamine, dimethylhexadecylamine, imidazole, 2-methyl imidazole, 3-(2-methyl-1H-imidazol-1-yl)propanenitrile, 2-ethyl-4-methyl-1H-imidazole-1-propanenitrile, 5-amino-1,3,3,-trimethylcyclohexanemethylamine and benzylamine, 2-ethyl-4-methyl-imidazole, phenyl-imidazole, benzyl-imidazole, 1-methyl imidazole, 2-ethyl imidazole, 2-isopropyl imidazole, 2-phenyl imidazole, 1-benzyl-2-methyl imidazole, 2-undecyl imidazole, 2-heptadecyl imidazole, 1,2-dimethyl imidazole, 2-phenyl-4methyl imidazole, 1-benzyl-2-phenyl imidazole, 3-(2-undecyl-1H-imidazol-1-yl) propanenitrile, 3-(2-phenyl-1H-imidzol-1-yl)propanenitrile, N,N-dimethyl-N-phenylurea, 3,3'-(4-methyl-1,3-phenylene) bis (1,1-dimethylurea), 1-(3,4-dichlorophenyl)-3,3-dimethylurea, 4,4'methylenedianiline, dimethylaminomethylphenol, 2,4-diamino-6-[2'-methylimidazolyl-(1')]-ethyl-s-triazine, 2,4-diamino-6-[2'-methylimidazolyl-(1')]-ethyl-s-triazineisocyanuric acid adduct dyhydrate, 2-phenyl-4,5-hihydroxymethylimidazole, 1-amino-3-aminomethyl-3,5,5-trimethylcyclohexane (IPD), diethylenetriamine (DETA), tetraethylenepentamine, 2-methyl-1,5-diaminopentane, 1,3-benzenedimethanamine and ethylenediamine.

In one embodiment, the catalyst or curing agent is selected from the group consisting of triethylenediamine (TEDA), bis(dimethylaminoethyl)ether (BDMAEE), dimethylaminoethanol, dimethylaminoethyl-N-methylethanolamine, diethylaminoethoxyethanol, dimethylaminoethylmorpholine, N-ethyl-morpholine, 2-ethyl-4-methyl imidazole, 4-methyl imidazole, tris-2,4,6,-Dimethylaminomethylphenol, pentamethyldiethyltriamine, N, N-dimethylcyclohexylamine, tris-(dimethylaminopropyl)amine, dicyclohexylmethylamine, bis(dimethylamino)propylamine, dimethylaminopropyl-N-methylpropanol, tris(dimethylaminopropyl)triazine, methoxypropylmorpholine, bis(dimethylaminopropyl)methylamine, diemthylaminopropylamine, 1,8-diazabicyclo(5,4,0)undecene-7, diglycolamine, dimethylpiperazine, methoxymethylmorpholine, bis[2-(morpholine)-ethyl]ether, N,N",N"-tetramethyl-N'-2-hydroxypropyldiethyltriamine, N-dimethylaminoethyl-N-methylpiperazine, tetramethylethylenediamine, N,N-dimethylaminoethyl-N',N'-diemthylaminopropylether, N,N', N'-tetramethylbutanediamine, N-cocomorpholine, trimethylamine, N,N,N',N'-tetramethylhexanediamine, 1-(2-hydroxyethyl)-4-methylmorpholine, 1-(2-hydroxyethyl)-4-methylpiperazine, tetramethyl-2-hydroxypropyldiamine, hydroxyethylmorpholine, bis(dimethylaminopropyl)ethyleneglycolether, tetramethylguadinine, hexamethyltriethyltetraamine, dimethylaminopropylimidazole, dimethylbenzylamine and dimethylhexadecylamine.

In one embodiment, the curative is 1,4-diaminobutane, 1,3-diaminopropane or dimethylbenzylamine.

In one embodiment, the curative may be an amine in tetrafluoroborate salt form such as benzylammonium tetrafluoroborate, isopropylammonium tetrafluoroborate, ethylammonium tetrafluoroborate, 1,4-diaminobutane tetrafluoroborate salt, 1,5-diaminopentane tetrafluoroborate salt, 1,6-diaminohexane tetrafluoroborate salt, 1,7-diaminobutane tetrafluoroborate salt, 1,8-diaminooctane tetrafluoroborate salt, 1,9-diaminononane tetrafluoroborate salt, or ammonium tetrafluoroborate. For example, the curative may be selected from benzylammonium tetrafluoroborate, isopropylammonium tetrafluoroborate, ethylammonium tetrafluoroborate, 1,4-diaminobutane tetrafluoroborate salt, 1,5-diaminopentane tetrafluoroborate salt, 1,6-diaminohexane tetrafluoroborate salt, 1,7-diaminobutane tetrafluoroborate salt, 1,8-diaminooctane tetrafluoroborate salt, 1,9-diaminononane tetrafluoroborate salt.

Complex

In one aspect the present invention provides a complex of a cucurbituril with a curative. The complex is a non-covalent complex. The complex may also be referred to as a supramolecular complex.

As noted above, the complex may be a binary complex or a ternary complex. Thus, the cucurbituril may hold one or two guest molecules within its cavity.

The worked examples of the present case show that CB[8] forms a binary complex with 1,4-diaminobutane and 1,3-diaminopropane, and forms a tertiary complex with dimethylbenzylamine. CB[6] forms a binary complex with 1,4-diaminobutane.

Where a cucurbituril hosts two guest molecules, the guest molecules may be the same or they may be different. A cucurbituril that is capable of hosting two guest molecules may also be capable of forming a stable binary complex with a single guest. The formation of a ternary guest-host complex is believed to proceed via an intermediate binary complex.

In one embodiment, the complex is a ternary complex. The two guests in the complex may be the same, as shown in the worked examples of the present case.

Ternary guest complexes where the guests are different are well known. Thus, the present inventors also contemplate the use of such complexes in the present case. A first guest molecule may be a curative as described herein. The second guest molecule may be a guest that is provided for the purpose of forming the ternary complex. However, the second guest molecule may also have functionality that is useful in the curing of the composition, or for altering the properties of the cured product.

The second guest may be another curative. For example, the first guest may be a cure hardener and the second guest may be a cure accelerator. Alternatively, both guests may be cure hardeners or cure accelerators.

Where the complex comprises two guests within the cucurbituril cavity, the association constant, $K_a$, for that complex is at least $10^3$ $M^{-2}$, at least $10^4$ $M^{-2}$, at least $10^5$ $M^{-2}$, at least $10^6$ $M^{-2}$, at least $10^7$ $M^{-2}$, at least $10$ $M^{-2}$, at least $10^9$ $M^{-2}$, at least $10^{10}$ $M^{-2}$, at least $10^{11}$ $M^{-2}$, or at least $10^{12}$ $M^{-2}$.

Where the complex comprises one guest within the cucurbituril cavity, the association constant, $K_a$, for that complex is at least $10^3$ $M^{-1}$, of at least $10^4$ $M^{-1}$, of at least $10^5$ $M^{-1}$, of at least $10^6$ $M^{-1}$, of at least $10^7$ $M^{-1}$, of at least $10^8$ $M^{-1}$, of at least $10^9$ $M^{-1}$, of at least $10^{10}$ $M^{-1}$, of at least $10^{11}$ $M^{-1}$, or of at least $10^{12}$ $M^{-1}$. In one embodiment, the guest is a compound capable of forming a complex which has an association constant in the range $10^4$ to $10^7$ $M^{-1}$.

The formation of the complex is reversible. The decomplexation of the complex to separate the cucurbituril from the guest or guests may be achieved by heating the complex, irradiating the complex or by introducing a competitive agent. Alternatively, a combination of these decomplexation methods may be used. For example, decomplexation of the complex may be achieved by introducing a competitive agent and then heating the complex. This is discussed in further detail below in relation to the cure of the composition.

Whilst a curative is in complex it may be referred to as a latent curative. Thus, curative reactivity is prevented by the complex, and this reactivity is revealed only upon decomplexation of the complex.

Complex Formation

A complex of cucurbituril with a curative may be prepared by mixing aqueous cucurbituril solution with the curative before drying to a powder. Mixing of the cucurbituril and curative may take place in aqueous solutions, aqueous/organic mixes, organic solvent without water, or in acidified solutions. Examples of organic solvents include MeOH, EtOH and MeCN.

Alternatively, a complex of a cucurbituril with a curative may be prepared by simply mixing the cucurbituril with the curative, i.e., the formation of the complex may be achieved without the need for a solvent, and the cucurbituril and the curative may be mixed substantially free of other components.

At room temperature cucurbiturils are typically solids. Where the curative is also a solid, the cucurbituril and the catalyst or curing agent may be dry mixed to form the complex.

The inventors have found that it is beneficial to provide a complex in solid form, for example, in the form of a powder. When such a complex is provided in the composition, the composition is seen to have a greater stability (a reduced amount of polymerisation at ambient temperature) when compared with a complex that is provided with solvent. It is believed that the lack of solvent increases the time for any free curative compound to solubilise in the composition, which has the effect of reducing the reaction rate of the curative.

Decomplexing Agent

Decomplexing agents act as competitive agents and may be added to the epoxy composition to further accelerate the rate of curing. The terms "decomplexing agent" and "competitive agent" are used interchangeably throughout.

In one embodiment, the decomplexing agents are imidazolium derived ionic liquids that displace curatives from the cucurbituril, thus forming a new complex between the ionic liquid and cucurbituril. Upon displacement of the curative from the cucurbituril by the decomplexing agent the curing process begins.

Since the displacement of the curative from the cucurbituril is a thermally driven process, the latency of the epoxy resins is in the order of days to weeks and similar to those epoxy resins that do not contain decomplexing agents.

One advantage of using decomplexing agents is to lower the temperature at which curing commences. For example, with epoxy compositions requiring a temperature of at least 100° C., a decomplexing agent can be added to the epoxy composition before heating at a lower temperature of, for example, 60° C. to initiate curing. In a further example, with epoxy compositions which do not cure even at very high temperatures, for example 160° C., a decomplexing agent can be added to initiate curing. The composition may then cure within about 8 hours, for example within about 6 hours.

In one embodiment, the decomplexing agent is an imidazolium-containing compound.

Suitable decomplexing agents may be selected from the group consisting of N,N,N-trimethyl-N-benzylammonium bromide, 1,3-diethylimidazolium iodide, 1,3-diethylimidazolium bromide, 1-methyl-3-butylimidazolium bromide, 1-methyl-3-hexylimidazolium bromide, 1-methyl-3-heptylimidazolium bromide, 1-methyl-3-octylimidazolium bromide, 1-methyl-3-nonylimidazolium bromide, 1-methyl-3-decylimidazolium bromide, 1-benzyl-3-methylimidazolium bromide, 1-methyl-3-naphthylimidazolium bromide, and mixtures thereof.

In one aspect of the present invention there is provided a kit comprising an epoxy composition and a decomplexing agent, wherein the epoxy composition and decomplexing agent are contained in separate containers.

The epoxy composition and decomplexing agent can be dispensed from the kit and then mixed together prior to use. The mixed composition is stable for 1, 2, 5, 6, 7, 8 or 12 days or more at ambient temperatures. When curing is required, the mixed composition can be heated to a relatively low temperature of about 60° C.

Epoxy Compound

The composition of the invention comprises an epoxy compound which is suitable for use in preparing a cured epoxy resin product.

Epoxy compounds (oxirane compounds) for use in polymerisation reactions, such as ring opening polymerisation reactions, are well known in the art.

Particularly preferred epoxy compounds are those suitable for use in forming cured adhesive products.

The choice of epoxy compound will depend upon the intended application of the cured epoxy product, such as the use of the product as an adhesive, and the desired physical characteristics of the product, including tackiness, weatherability, T-peel adhesion, and shear strength, amongst others.

The epoxy compound may be a monomeric epoxy compound or a polymeric epoxy compound (which may be referred to as an epoxy resin). The polymeric epoxy compound may have a range of molecular weights.

In one embodiment, the epoxy compound comprises one or two epoxy groups, such as two epoxy groups.

Suitable epoxy compounds for use include those epoxy containing resins and compounds described in EP 1,252,271, such as from paragraphs [0026] to [0032], the contents of which are hereby incorporated by reference.

Suitable epoxy compounds are also available, from commercial sources, for example from epotec, and other firms who provide epoxy compounds (including epoxy resins) for use in cured epoxy resins.

The epoxide compound may be an aromatic glycidyl ether, such as a bisphenol epoxy resin, such as bisphenol A diglycidyl ether or bisphenol F diglycidyl ether, or a hydrogenated version of the aromatic glycidyl ether.

Further example epoxy compounds include tetrabromobisphenol A, epoxy phenol Novolacs, and epoxy resol Novolacs In one embodiment, the epoxy compound is vinylcyclohexene dioxide.

In one embodiment, the epoxy compound is selected from the epoxy compounds listed above.

In one embodiment, the epoxy compound has a weight average molecular weight, of at least 150, at least 200, at least 250 or at least 300.

In one embodiment, as the epoxy compound has a weight average molecular weight, of at most 500, at most 1,000, at most 5,000 or at most 10,000.

In one embodiment, the epoxy equivalent weight of the epoxy compound is at least 160, at least 170, or at least 180 gm equivalents.

In one embodiment, the epoxy equivalent weight of the epoxy compound is at most 200, at most 250, at most 300 or at most 350 gm equivalents.

In one embodiment, the epoxy compound has a low viscosity, such as a viscosity of at most 5,000, at most 1,000, at most 500, at most 100 or at most 50 mPa·s. The viscosity values refer to dynamic (shear) viscosity as measured at 25° C. using standard techniques.

The epoxy compound may be a solid or a liquid, for example at 25° C.

The epoxy compounds may have additional functionality, such as hydroxyl or amino functionality.

The polymerizable composition may contain mixtures of epoxy compounds, including stereo and regioisomers.

Epoxy Composition

The present invention provides an epoxy composition comprising an epoxy compound and a complex of a cucurbituril with a curative.

The epoxy composition may also comprise the curative in uncomplexed form. Thus, the composition may include the curative in a complex with cucurbituril, and curative that is not in complex with cucurbituril.

The inventors have found that it is not necessary for all the curative in the composition to be present in complex with cucurbituril. The epoxy composition of the invention remains stable if there is uncomplexed cucurbituril present in the mixture.

Thus, in one embodiment the composition comprises complexed and uncomplexed cucurbituril. The composition may therefore comprise complexed and/or uncomplexed curing agent and/or complexed and/or uncomplexed catalyst, providing that at least a proportion of the curing agent and/or catalyst is complexed. The ratio of complexed and uncomplexed may be selected as appropriate to achieve the maximum composition stability.

The inventors have found that the composition remains stable when a significant amount of curative is uncomplexed. Thus, the curative is present in the composition, and at least 10 mole %, at least 20 mole %, at least 25 mole %, at least 30 mole %, at least 35 mole %, at least 40 mole %, at least 50 mole %, at least 60 mole %, at least 70 mole %, at least 80 mole %, at least 90 mole %, or at least 95 mole %, or 100 mole % of the total amount of curative in the composition is present in complex with cucurbituril.

The curative is present in the composition, and at least 10 mole %, at least 20 mole %, at least 25 mole %, at least 30 mole %, at least 30 mole %, at least 40 mole %, at least 50 mole %, at least 60 mole %, at least 70 mole %, at least 80 mole %, at least 90 mole %, or at least 95 mole % of the curative is present in complex with cucurbituril.

In one embodiment, at least 50 mole % of the curative is present in complex with cucurbituril.

In one embodiment, at least 50 mole %, or at least 75 mole % of the curative is present in complex with cucurbituril.

The total amount of curative can be made up of cure accelerator and/or cure hardener.

The inventors have found that compositions where 25 mole % of the curative is complexed are semi-stable. The inventors have shown that compositions having 25 mole % of the curative in complex are stable for up to 6 days at ambient temperatures. Where the curative is not in complex, the composition is stable for less than one day at ambient temperatures.

Therefore even low amounts of complex provide a stabilizing effect to the epoxy composition.

Without wishing to be bound by theory, it is believed that by having at least some of the curative complexed with cucurbituril, the total amount of curative present in the mixture and available for reaction is effectively reduced, and hence the premature curing reaction is reduced.

Accordingly, it is not necessary to complex all the curative in the composition, and the amount of cucurbituril present in the composition may be reduced.

In an alternative embodiment, substantially all the curative is in complex with cucurbituril. In one embodiment, 100 mole % of the curative is present in complex with cucurbituril. For example, 100 mole % can be achieved when the cucurbituril is complexed with a catalyst as the curative.

The composition may comprise additional components for modifying the cure reaction, such as accelerating the cure reaction, or for modifying the properties of the cured product, such as modifying the adhesive properties of the cured product.

In one embodiment, the composition comprises two complexes, where the first complex is a complex of cucurbituril and a cure hardener and the second complex comprises a complex of cucurbituril and a cure accelerator.

Example additional components may include one or more components selected from the group consisting of inorganic fillers; additional cure accelerators; additional cure hardeners; UV absorbers; flame retardants; viscosity modifiers, pigment and colours, and fragrances.

Example additional components include those described in EP 1,252,271, such as from paragraphs [0049] to [0051], the contents of which are hereby incorporated by reference.

In one embodiment, the composition is an adhesive composition. An adhesive composition is suitable for preparing a cured product having adhesive properties.

The amount of each component within the composition is selected based on the desired properties of the resultant cured product.

Within the composition, it is not essential for all the curative to be in complex with cucurbituril. The inventors have found that when some curative is not in complex the composition is nevertheless stable under ambient conditions, and premature polymerization is not observed. The amount of curative in complex is therefore sufficiently high to prevent reaction of the composition.

In one embodiment, substantially all of the curative is in complex.

Typically, the epoxy compound is provided in weight or mole excess with respect to the complex, and therefore in excess to the curative.

In one embodiment, the complex may be present within the composition in an amount of at most 10, at most 15, at most 20, or at most 30 wt %.

In one embodiment, the complex may be present within the composition in an amount of at least 0.1, at least 0.5, at least 1, at least 2, or at least 5 wt %.

In one embodiment, the complex may be present within the composition within a range where the upper and lower limits are selected from the values given above. For example the complex may be present within the composition in amount in the range 2 to 10 wt %.

In one embodiment, the epoxy compound may be present within the composition in an amount of at most 50 wt %, at most 60 wt %, at most 70 wt %, at most 80 wt %, at most 90 wt % or at most 95 wt %.

In one embodiment, the epoxy compound may be present within the composition in an amount of at least 10 wt %, at least 20 wt %, at least 30 wt % or at least 40 wt %. In one embodiment, the epoxy compound may be present within the composition within a range where the upper and lower limits are selected from the values given above. For example the epoxy compound may be present within the composition in amount in the range 40 to 95 wt %.

In one embodiment, the mole ratio of curative to epoxy compound in the range 1:1 to 1:100, such as 1:2 to 1:50, such as 1:5 to 1:25, such as 1:5 to 1:20.

In one embodiment, the mole ratio of curative to epoxy compound within the composition may be around 1:10. The amount of curative refers to the total amount of the curative present in the composition, which is the amount of the curative present in complex plus the amount of curative that is not present in complex.

The presence of the complex within the composition is not believed to substantially change the overall viscosity of the composition, which is typically dictated by the viscosity of the epoxy compound.

The composition may be stored at ambient temperatures, such as 25° C., for 1, 2, 5, 6, 7, 8 or 12 days or more without noticeable curing of the composition.

Composition Formation

The composition of the invention may be prepared by mixing the complex and the epoxy compound together. As noted above, providing the complex in solid form is advantageous. Also noted above, the presence of a solvent may be optional, and the composition may be prepared by simple admixture of the complex and the epoxy compound, optionally together with other components.

Where a solvent is present, it may be present during the mixture of the complex and the epoxy compound, and the solvent may be subsequently removed, for example prior to storage or prior to curing.

After the composition is prepared it may be stored until required for use. The inventors have found that the compositions of the invention have excellent stability and may be stored at ambient temperature for 12 days or more without undesirable premature polymerisation of composition.

The mixing process is conducted at a temperature below the decomplexation temperature of the complex, for example at a temperature of less than 50° C., such as less than 40° C.

In one embodiment, a decomplexing agent is added to the epoxy composition. The decomplexing agent is as described herein and is generally in a liquid form.

Composition Cure

The composition of the invention remains uncured whilst the curative is in complex with the cucurbituril. Removal of the curative from the complex makes the curative available for reaction with the epoxy compound.

The decomplexation of the complex may be achieved by heating the composition containing the complex. Under these conditions, the released curative may then react with the epoxy compound to form a cured resin product.

In alternative embodiments, the complex may be disrupted by alternative methods. For example, decomplexation of the complex may be achieved by irradiation of the complex or by introduction of a competitive agent to displace the curative from the complex.

For example, the curative may include azobenzene functionality, for example the guest may be cis-diaminoazobenzene. Irradiation of the guest may induce isomerisation of the azobenzene, causing decomplexation.

Decomplexation may be achieved by a combination of these methods, for example by use of a competitive agent prior to heating of the composition containing the complex.

The use of a competitive agent is less preferred, as this requires the addition of a further agent to the composition to initialise the decomplexation. Thus, the competitive agent must be supplied separately to the epoxy composition. In contrast, the application of heat or light avoids the need to provide additional agents. However, use of a competitive agent can be advantageous as it lowers the temperature at which curing commences. Where a competitive agent, or decomplexing agent, is used the agent may be provided in a kit with the epoxy composition where the decomplexing agent and epoxy composition are held separately, as described above.

An advantage of the present invention is that the curative may be released from the complex at moderate temperatures, therefore avoiding the need to use very high temperatures to initiate the cure of the composition. Nevertheless the temperatures required to separate the complex are still sufficiently high as to prevent decomplexation to occur under normal ambient temperatures (such as temperatures in the range 15 to 35° C.). Thus, the compositions of the invention are suitable for storage under ambient conditions without undesirable curing. This allows for longer working times before curing.

In one embodiment, the decomplexation of the complex and the resin cure is performed at a temperature of at least 50° C., such as at least 60° C., such as at least 70° C.

In one embodiment, the decomplexation of the complex and the resin cure is performed at a temperature of at most 90° C., at most 100° C., at most 105° C., at most 110° C., at most 120° C., at most 150° C., at most 180° C. or at most 200° C. In one embodiment, the decomplexation of the complex and the resin cure is performed at a temperature of at most 90° C., at most 100° C., at most 105° C., at most 110° C.

In one embodiment, the decomplexation of the complex and the resin cure is performed at a temperature of between 60° C. and 200° C., between 70° C. and 180° C. or between 80° C. and 150° C.

In one embodiment, the decomplexation of the complex may be achieved at a first temperature, and following decomplexation the composition may be cured by heating the composition to a second, higher temperature. Generally, however decomplexation and curing are conducted at the same temperature. This simplifies the cure of the epoxy composition.

Thus the composition of the invention may be cured by the application of heat.

The curing step may include the application of pressure to the reaction mixture. Thus, the curing reaction may be performed in suitable pressurizable reactor.

The curing of epoxy compositions is an exothermic reaction and often generates significant heat. Excessive and uncontrolled exotherms can result in overheating of the epoxy composition and possible thermal runaway, where the rate of heat generated by the reaction exceeds the removal rate, increasing the rate of reaction and the amount of heat produced. This causes a significant health and safety risk to the user and anyone in the vicinity of the reaction. An advantage of the present invention is the reduced exotherm exhibited by the epoxy composition during curing. The temperature spike is minimised thereby resulting in a curing process which is less likely to result in a thermal runaway.

The present invention also allows for the production of larger composite materials with exotherm control.

Cured Epoxy Composition

The present invention provides a cured epoxy product obtained or obtainable from the epoxy composition. Such a product may be prepared by the curing steps described above.

In one embodiment, the cured epoxy product comprises cucurbituril. For example the cucurbituril may be dispersed throughout the product. It is believed that the cucurbituril will be present in uncomplexed from, and it will not form complexes with, for example, unreacted curative. The cured product is typically a solid or is highly viscous, thereby preventing or minimising diffusion of components within the product. Thus, it is thought that the diffusion of species through the cured product will be minimal, and there will little if no opportunity for the cucurbituril to form complexes within the cured product.

In one aspect of the present case there is provided the use of the cured epoxy composition as an adhesive. The adhesive may be provided in the form of a film, such as a thin film having a thickness of at most 1.0 mm, such as at most 0.50 mm, such as at most 0.25 mm The present case also provides the use of the epoxy composition in the preparation of an adhesive.

In one aspect of the invention there is provided a method of providing an adhesive on a first surface, the method comprising the steps of providing a epoxy composition on a surface and curing the epoxy composition. In one embodiment, a second surface is provided in contact with the composition prior to curing. Thus, the compositions of the invention may be interposed between two surfaces to be adhered. Curing of the interposed composition forms a joint between the surfaces.

In embodiments where a decomplexing agent is used, the decomplexing agent is mixed with the epoxy composition prior to being applied to a surface.

Other Preferences

Each and every compatible combination of the embodiments described above is explicitly disclosed herein, as if each and every combination was individually and explicitly recited.

Various further aspects and embodiments of the present invention will be apparent to those skilled in the art in view of the present disclosure.

"and/or" where used herein is to be taken as specific disclosure of each of the two specified features or components with or without the other. For example "A and/or B" is to be taken as specific disclosure of each of (i) A, (ii) B and (iii) A and B, just as if each is set out individually herein.

Unless context dictates otherwise, the descriptions and definitions of the features set out above are not limited to any particular aspect or embodiment of the invention and apply equally to all aspects and embodiments which are described.

Certain aspects and embodiments of the invention will now be illustrated by way of example and with reference to the figures described above.

EXPERIMENTAL AND RESULTS

Complex Example 1

1,4-Diaminobutane (DAB, 2.89 mmol) was dissolved in 50 mL of water at room temperature, with stirring. To this was added CB[8] (2.80 mmol) followed by a further 10 mL of water to rinse residual CB[8] from the sides of the flask into the mixture. The resulting slurry was stirred at room temperature for 24 hours. The solid was collected by filtration and dried in a vacuum oven at 40° C. NMR shifts indicated that the 1,4-Diaminobutane was within the CB[8] cavity, giving an amine loading of 50.5 mg/g.

$^1$H NMR (400 MHz, 20% DCI in D2O) δ 3.77-3.54 (br, 32H), 2.33 (d, 16H), 1.06 (br, s, 4H), −0.23 (br, s, 4H).

c.f. NMR of 1,4-Diaminobutane $^1$H NMR (400 MHz, 20% DCI in D2O) δ 2.48 (m, 4H), 1.25 (m, 4H).

Complex Example 2

1,4-Diaminobutane (DAB, 2.4 mmol) was dissolved in 50 mL of water at room temperature, with stirring. To this was added CB[6] (2.4 mmol) followed by a further 10 mL of water to rinse residual CB[6] from the sides of the flask into the mixture. The resulting slurry was stirred at room temperature for 24 hours. The solid was collected by filtration and dried in a vacuum oven at 40° C. NMR shifts indicated that the 1,4-Diaminobutane was within the CB[6] cavity, giving an amine loading of 65.6 mg/g.

$^1$H NMR (400 MHz, 20% DCI in D2O) δ 3.70 (s, 12H), 3.63 (d, 12H), 2.47 (d, 12H), 0.19 (br, s, 4H), −1.52 (br, m, 4H).

c.f. NMR of 1,4-Diaminobutane $^1$H NMR (400 MHz, 20% DCI in D2O) δ 2.48 (m, 4H), 1.25 (m, 4H).

Complex Example 3

1,3-Diaminopropane (DAP, 17.97 mmol) was dissolved in 50 mL of water at room temperature, with stirring. To this was added CB[8] (2.93 mmol) followed by a further 10 mL of water to rinse residual CB[8] from the sides of the flask into the mixture. The resulting slurry was stirred at room temperature for 24 hours. The solid was collected by filtration and dried in a vacuum oven at 40° C. NMR shifts indicated that the 1,3-Diaminopropane was within the CB[8] cavity and integration gave a ratio of 1:1 CB[8]:DAP, giving an amine loading of 41.6 mg/g.

$^1$H NMR (400 MHz, 20% DCI in D2O) δ 3.66 (d, 16H), 3.63 (s, 16H), 2.32 (d, 16H), 1.74 (t, 2H), 1.13 (m, 2H), 0.15 (qn, 2H).

c.f. NMR of 1,3-Diaminopropane $^1$H NMR (400 MHz, 20% DCI in D2O) δ 2.14 (t, 4H), 1.12 (qn, 2H).

Complex Example 4

Dimethylbenzylamine (DMBA, 0.76 g, 5.6 mmol) was dissolved in 50 mL of water at room temperature with stirring. To this solution was added CB[8] (4.782 g, 2.8 mmol). The resulting slurry was stirred at room temperature for 24 hours. The slurry was then filtered by vacuum filtration to isolate the solid particulates and left to air-dry. The beige powder was dried in a vacuum oven at 40° C. for 24 hours. NMR shifts indicated that the DMBA was within the CB[8] cavity.

CB[8]+DMBA: $^1$H NMR (400 MHz, 20% DCI in D$_2$O) δppm: 4.56-4.60 (t, 1H, Ar—CH), 4.37-4.41 (t, 2H, Ar—H), 4.22 (d, 2H, Ar—H), 3.64-3.67 (d, 16H, CB[8]), 3.60 (s, 16H, CB[8]), 2.28-2.32 (d, 16H, CB[8]), 1.51 (s, 2H, Benzyl CH2), 0.69 (s, 6H, N-Me).

c.f. NMR of Dimethylbenzylamine (DMBA): $^1$H NMR (400 MHz, 20% DCI in D$_2$O) δ ppm: 5.66 (m, 5H, Ar—H), 2.45 (m, 2H, Benzyl-CH2), 0.98 (m, 6H, N-Me).

Complex Example 5

Imidazole (SIZ, 40 mg, 0.625 mmol) was added to a stirred suspension of CB[8] (1 g, 0.625 mmol) and the mixture stirred for 3 hours. The solution was then frozen at −18° C. and dried by lyophilisation.

CB[8]+SIZ: $^1$H NMR (400 MHz, 20% DCI in D$_2$O) δ ppm: 6.68 (1H, s, SIZ), 5.46 (2H, d, SIZ), 3.63 (16H, d, CB[8]), 3.59 (16H, s, CB[8]), 2.28 (16H, d, CB[8])

Curing Example 1

To demonstrate that an inert form of the curing agent can be prepared by the encapsulation of amine in CB[8], the free 1,4-Diaminobutane (DAB) and CB[8]-DAB complexes (from Complex Example 1) were weighed out into 7 mL wide neck vials as per the values given in Table 1. To this was added Bisphenol A diglycidyl ether (EP3) as per the values given in Table 1. The mixtures were shaken until the amine was dissolved and then stored at 60° C. or room temperature. The samples were inspected periodically for evidence of curing by inverting the vial. Results are shown in Table 2.

TABLE 1

Sample Composition

| Sample | Amine | Epoxide | Temp | Epoxide (mmol) | Amine (mmol) | Amine within CB[8] (mmol) | Total amine (mmol) | Equivalents Amine:Epoxide |
|---|---|---|---|---|---|---|---|---|
| EXP-5-A | DAB | EP3 | 60° C. | 2.73 | 0.409 | — | 0.409 | 0.15 |
| EXP-5-B | DAB | EP3 | 60° C. | 2.73 | 0.307 | 0.102 | 0.409 | 0.15 |
| EXP-5-C | DAB | EP3 | 60° C. | 2.73 | 0.205 | 0.205 | 0.410 | 0.15 |
| EXP-5-D | DAB | EP3 | R.T. | 2.73 | 0.409 | — | 0.409 | 0.15 |
| EXP-5-E | DAB | EP3 | R.T. | 2.73 | 0.307 | 0.102 | 0.409 | 0.15 |
| EXP-5-F | DAB | EP3 | R.T. | 2.73 | 0.205 | 0.205 | 0.410 | 0.15 |

R.T. is room temperature, approx. 25° C.

TABLE 2

Composition Properties over Time

| Sample | 1 day | 2 days | 6 days | 7 days | 8 days | 12 days |
|---|---|---|---|---|---|---|
| EXP-5-A | Hard glass | Hard glass | Hard glass | Hard glass | Hard glass | Hard glass |
| EXP-5-B | Firm near glass | Hard glass | Hard glass | Hard glass | Hard glass | Hard glass |
| EXP-5-C | Soft glass | Firm glass | Hard glass | Hard glass | Hard glass | Hard glass |
| EXP-5-D | Firm near glass | Hard glass | Hard glass | Hard glass | Hard glass | Hard glass |
| EXP-5-E | Firm gel | Firm gel | Firm gel | Firm near glass | Glass | Glass |
| EXP-5-F | Soft gel | Soft gel | Soft gel | Soft gel | Soft gel | Soft gel |

It can be seen that all the samples cure quickly at 60° C., regardless of whether the amine used is free or a mixture of free and CB[8] encapsulated. However at room temperature when the sample containing purely free amine has solidified (6 days) the samples containing part free amine and part encapsulated amine remain as gels. EXP-5-F even remains as a gel after 12 days. This clearly demonstrates that curing at room temperature has been inhibited by the encapsulation of the amine in CB[8].

The results also indicate that at 60° C. amine is released from CB encapsulation and facilitates the curing process. It is likely that the slightly slower time frame of curing for sample EXP-5-B compared to EXP-5-A is due to the fact that CB[8] remains a solid at this temperature and this may slow the diffusion of the released amine through the mixture.

Curing Example 2

To demonstrate that an inert form of the curing agent can be prepared by the encapsulation of amine in CB[6], the free 1,4-Diaminobutane (DAB) and CB[6]-DAB complexes (from Complex Example 2) were weighed out into 7 mL wide neck vials as per the values given in Table 3. To this was added Bisphenol A diglycidyl ether (EP3) as per the values given in Table 3. The mixtures were shaken until the amine was dissolved and then stored at 60° C. or room temperature. The samples were inspected periodically for evidence of curing by inverting the vial. Results are shown in Table 4.

TABLE 3

Sample Composition

| Sample | Amine | Epoxide | Temp | Epoxide (mmol) | Amine (mmol) | Amine within CB[6] (mmol) | Total amine (mmol) | Equivalents Amine:Epoxide |
|---|---|---|---|---|---|---|---|---|
| EXP-6-A | DAB | EP3 | 60° C. | 2.73 | 0.409 | — | 0.409 | 0.15 |
| EXP-6-B | DAB | EP3 | 60° C. | 2.73 | 0.307 | 0.102 | 0.409 | 0.15 |
| EXP-6-C | DAB | EP3 | 60° C. | 2.73 | 0.205 | 0.205 | 0.410 | 0.15 |
| EXP-6-D | DAB | EP3 | R.T. | 2.73 | 0.409 | — | 0.409 | 0.15 |
| EXP-6-E | DAB | EP3 | R.T. | 2.73 | 0.307 | 0.102 | 0.409 | 0.15 |
| EXP-6-F | DAB | EP3 | R.T. | 2.73 | 0.205 | 0.205 | 0.410 | 0.15 |

TABLE 4

Composition Properties over Time

| Sample | 1 day | 2 days | 6 days | 7 days | 8 days | 12 days |
|---|---|---|---|---|---|---|
| EXP-6-A | Hard glass | Hard glass | Hard glass | Hard glass | Hard glass | Hard glass |
| EXP-6-B | Maleable glass | Hard glass | Hard glass | Hard glass | Hard glass | Hard glass |
| EXP-6-C | Soft glass | Soft glass | Hard glass | Hard glass | Hard glass | Hard glass |
| EXP-6-D | Firm near glass | Hard glass | Hard glass | Hard glass | Hard glass | Hard glass |
| EXP-6-E | Firm gel | Firm gel | Firm gel | Firm gel | Firm gel | Firm near glass |
| EXP-6-F | Soft gel | Soft gel | Soft gel | Soft gel | Soft gel | Soft gel |

Again, all the samples cure within 6 days at 60° C., regardless of whether the amine used is free or a mixture of free and CB[6] encapsulated. However at room temperature when the sample containing purely free amine has solidified (8 days) the samples containing part free amine and part encapsulated amine remain as gels. An EXP-6-F which contains higher levels of encapsulated amine than EXP-6-E remains as a gel even after 12 days.

The experiment also shows that encapsulation of the amine in CB[6] slows the curing rate of the epoxide at room temperature, but still allows it to be easily cured once at elevated temperature, in this example at 60° C.

Curing Example 3

The amine 1,3-Diaminopropane (DAP) and CB[8] encapsulated amine (as prepared in Complex Example 3) were weighed out into 7 mL wide neck vials in the amounts set out in Table 5. To each vial was added Bisphenol A diglycidyl ether (EP3) in the amounts set out in Table 5, giving a final ratio of total amine to epoxide of 0.15:1. The mixtures were stirred with a spatula for 1 min. then stored at 60° C. or room temperature as indicated in Table 5. The samples were inspected periodically for evidence of curing by inverting the vial and stirring with a spatula to assess consistency. The results are shown in Table 6.

TABLE 5

Sample Composition

| Sample | Amine | Epoxide | Temp | Epoxide (mmol) | Amine (mmol) | Amine within CB[8] (mmol) | Total amine (mmol) | Equivalents Amine:Epoxide |
|---|---|---|---|---|---|---|---|---|
| EXP-7-A | DAP | EP3 | 60° C. | 2.73 | 0.474 | — | 0.474 | 0.15 |
| EXP-7-B | DAP | EP3 | 60° C. | 2.73 | 0.356 | 0.119 | 0.475 | 0.15 |
| EXP-7-C | DAP | EP3 | 60° C. | 2.73 | 0.237 | 0.237 | 0.474 | 0.15 |
| EXP-7-D | DAP | EP3 | R.T. | 2.73 | 0.474 | — | 0.474 | 0.15 |
| EXP-7-E | DAP | EP3 | R.T. | 2.73 | 0.356 | 0.119 | 0.475 | 0.15 |
| EXP-7-F | DAP | EP3 | R.T. | 2.73 | 0.237 | 0.237 | 0.474 | 0.15 |

R.T. is room temperature, approx. 25° C.

TABLE 6

Composition Properties over Time

| Sample | 1 day | 2 days | 5 days | 6 days |
|---|---|---|---|---|
| EXP-7-A | Hard glass | Hard glass | Hard glass | Hard glass |
| EXP-7-B | Firm near glass | Hard glass | Hard glass | Hard glass |
| EXP-7-C | Soft gel | Hard glass | Hard glass | Hard glass |
| EXP-7-D | Hard glass | Hard glass | Hard glass | Hard glass |
| EXP-7-E | Firm near glass | Glass, imprintable | Glass, imprintable | Glass, imprintable |
| EXP-7-F | Soft gel | Soft gel | Soft gel | Soft gel |

The results in Table 6 reflect those shown and analysed in Curing Examples 1 and 2 and demonstrate that curing inhibition can be achieved with the encapsulation of different forms of amines.

Curing Example 4

To 1 g of bisphenol A diglycidyl ether (EP3) was added CB[8]+SIZ complex (from Complex Example 5). Latencies were measured as time to double viscosity at 25° C., recorded by rheology (20 mm parallel plate, shear rate ramp 0.1-100 s$^{-1}$). Samples were made with and without dicyandiamide (dicy) hardener. Epoxy resin compositions and results are displayed in Table 7.

TABLE 7

Resin Compositions and Results

| Epoxide | SIZ (pph) | CB[8] + SIZ (pph) | Dicy (pph) | Latency |
|---|---|---|---|---|
| EP3 | 1 | 0 | 0 | 8 hours |
| EP3 | 1 | 0 | 8 | 8 hours |
| EP3 | 1 | 26 | 0 | >30 days |
| EP3 | 1 | 26 | 8 | 6 days |

Curing Example 5

In this example, a decomplexing agent has been used to facilitate curing of EP3 with CB[8]+2-methylimidazole (2MZ) (encapsulated as per Complex Example 5). Samples and curing times described in Table 8.

TABLE 8

Sample and Curing Times

| Epoxide | Catalyst | Catalyst loading/pph | Decomplexing agent | Loading | Cure time (160° C.) |
|---|---|---|---|---|---|
| EP3 | 2MZ | 1 | N/A | N/A | 1 hour |
| EP3 | CB[8] + 2MZ | 22 | N/A | N/A | No cure |
| EP3 | CB[8] + 2MZ | 22 | $C_4$MIm Br | 60 | 5 hours |
| EP3 | CB[8] + 2MZ | 22 | $C_6$MIm Br | 65 | 4 hours |
| EP3 | CB[8] + 2MZ | 22 | $C_7$MIm Br | 69 | 3 hours |
| EP3 | CB[8] + 2MZ | 22 | $C_8$MIm Br | 72 | 3 hours |
| EP3 | CB[8] + 2MZ | 22 | $C_9$MIm Br | 75 | 6 hours |

REFERENCES

All documents mentioned in this specification are incorporated herein by reference in their entirety.

Lagona, J.; Mukhopadhyay, P.; Chakrabarti, S.; Isaacs, L., The cucurbit[n]uril family. *Angew. Chem. Int. Ed.* 2005, 44, 4844-4870.

The invention claimed is:

1. An epoxy composition comprising:
   (i) an epoxy compound; and
   (ii) a complex of a cucurbituril with a curative;
   wherein the curative is reactive with the epoxy compound to form a cured epoxy product.

2. The composition according to claim 1, wherein the cucurbituril compound is selected from the group consisting of cucurbit[5]uril, cucurbit[6]uril, cucurbit[7]uril, cucurbit[8]uril, cucurbit[10]uril, and cucurbit[n]uril.

3. The composition according to claim 2, wherein the cucurbituril compound is CB[8], CB[7], or CB[6] to cucurbit[8]uril, cucurbit[7]uril, or cucurbit[6]uril.

4. The composition according to claim 1, wherein the curative is a cure accelerator or a cure hardener.

5. The composition according to claim 4, wherein the composition comprises a cure accelerator and a cure hardener, wherein one or both of the cure accelerator and cure hardener is provided in complex with the cucurbituril, either within the same complex or in separate complexes.

6. The composition according to claim 1, wherein the curative is a compound having amino functionality, optionally wherein the curative is selected from the group consisting of imidazoles (imidazole-containing compound), primary aliphatic amines, aromatic amines, anilines, cycloaliphatic amines, benzylic amines, triazoles, phenols, amidoamines and polyamides.

7. The composition according to claim 1, wherein the epoxy compound is a monomeric epoxy compound or a polymeric epoxy compound, optionally wherein the epoxy compound is an aromatic glycidyl ether or a hydrogenated aromatic glycidyl ether.

8. The composition according to claim 1, wherein the composition additionally comprises the curative in uncomplexed form.

9. The composition according to claim 8, wherein the mole amount of curative in complexed form is at least 50 mole % or at least 75 mole % of the total amount of curative in the composition.

10. The composition according to claim 1, wherein the complex is a ternary complex comprising a first and second guest molecule, wherein at least one of the first guest and second guest molecules is a curative.

11. The composition according to claim 10, wherein both the first and second guest molecules are a curative, optionally wherein the first guest molecule is a cure accelerator and wherein the second guest molecule is a cure hardener; or wherein both the first and second guest molecules are cure hardeners or wherein both the first and second guest molecules are cure accelerators.

12. A method of curing an epoxy composition according to claim 1, the method comprising the steps of releasing the curative from the complex with the cucurbituril, and permitting the curative to react with the epoxy compound thereby to from a cured resin product.

13. The method of claim 12, wherein the curative is released from the complex upon the application of heat to the composition.

14. The method of claim 13, wherein the composition is heated to at least 50° C., thereby to release the curative from the complex, optionally wherein the composition is heated to at most 200° C. or at most 100° C.

15. The method of claim 13, wherein the curative is released from the complex by a decomplexing agent, optionally wherein the decomplexing agent is an imidazolium-containing compound, optionally wherein the decomplexing agent is selected from the group consisting of N,N,N-trimethyl-N-benzylammonium bromide, 1,3-diethylimidazolium iodide, 1,3-diethylimidazolium bromide, 1-methyl-3-butylimidazolium bromide, 1-methyl-3-hexylimidazolium bromide, 1-methyl-3-heptylimidazolium bromide, 1-methyl-3-octylimidazolium bromide, 1-methyl-3-nonylimidazolium bromide, 1-methyl-3-decylimidazolium bromide, 1-benzyl-3-methylimidazolium bromide and 1-methyl-3-naphthylimidazolium bromide, or a mixture thereof.

16. A kit comprising the epoxy composition according to claim 1 and a decomplexing agent, wherein the epoxy composition and decomplexing agent are each contained in separate containers.

17. A complex of a cucurbituril with a curative, wherein the curative is reactive with an epoxy compound to form a cured epoxy product.

18. The complex of claim 17, wherein the curative is selected from the group consisting of triethylenediamine (TEDA), bis(dimethylaminoethyl)ether (BDMAEE), dimethylaminoethanol, dimethylaminoethyl-N-methylethanolamine, diethylaminoethoxyethanol, dimethylaminoethylmorpholine, N-ethyl-morpholine, 2-ethyl-4-methyl imidazole, 4-methyl imidazole, tris-2,4,6,-Dimethylaminomethylphenol, pentamethyldiethyltriamine, N,N dimethylcyclohexylamine, tris (dimethylaminopropyl)amine, dicyclohexylmethylamine, bis(dimethylamino)propylamine, dimethylaminopropyl-N-methylpropanol, tris(dimethylaminopropyl)triazine, methoxypropylmorpholine, bis(dimethylaminopropyl)methylamine, dimethylaminopropylamine, 1,8 diazabicyclo(5,4,0)undecene-7, diglycolamine, dimethylpiperazine, methoxymethylmorpholine, bis[2-(morpholine)-ethyl]ether, N,N,N",N"-tetramethyl-N'-2-hydroxypropyldiethyltriamine, N-dimethylaminoethyl-N-methylpiperazine, tetramethylethylenediamine, N,N-dimethylaminoethyl-N',N'-diemthylaminopropylether, N,N,N',N'-tetramethylbutanediamine, N-cocomorpholine, trimethylamine, N,N,N',N' tetramethylhexanediamine, 1-(2-hydroxyethyl)-4-methylmorpholine, 1 (2 hydroxyethyl)-4-methylpiperazine, tetramethyl-2-hydroxypropyldiamine, hydroxyethylmorpholine, bis(dimethylaminopropyl)ethyleneglycolether, tetramethylguadinine, hexamethyltriethyltetraamine, dimethylaminopropylimidazole, dimethylbenzylamine, dimethylhexadecylamine, 2-methyl imidazole, 3-(2-methyl-1H-imidazol-1-yl)propanenitrile, 2-ethyl-4-methyl- 1H-imidazole- 1-propanenitrile, 5-amino- 1,3,3,-trimethylcyclohexanemethylamine, benzylamine, 2-ethyl-4-methyl-imidazole, phenyl -imidazole, benzyl-imidazole, 1-methyl imidazole, 2-ethyl imidazole, 2-isopropyl imidazole, 2-phenyl imidazole, 1-benzyl-2-methyl imidazole, 2-undecyl imidazole, 2-heptadecyl imidazole, 1,2-dimethyl imidazole, 2-phenyl-4methyl imidazole, 1-benzyl-2-phenyl imidazole, 3 -(2-undecyl- 1H-imidazol- 1 -yl) propanenitrile, 3 -(2-phenyl- 1H-imidzol- 1 -yl) propanenitrile, N,N-dim-ethyl-N-phenylurea, 3,3'-(4-methyl-1,3-phenylene) bis (1,1-dimethylurea), 1-(3,4-dichlorophenyl)-3,3-dimethylurea, 4,4'methylenedianiline, dimethylaminomethylphenol, 2,4-diamino-6-[2'-methylimidazolyl-(1')]-ethyl-s-triazine, 2,4-diamino-6-[2'-methylimidazolyl-(1')]-ethyl-s-triazineisocyanuric acid adduct dyhydrate, 2-phenyl-4,5-hihydroxymethylimidazole, 1-amino-3-aminomethyl-3,5,5-trimethylcyclohexane (IPD), diethylenetriamine (DETA), tetraethylenepentamine, 2-methyl-1,5-diaminopentane, 1,3-benzenedimethanamine and ethylenediamine.

19. A method of preparing an epoxy composition, the method comprising the step of mixing an epoxy compound and a complex of a cucurbituril with a curative, wherein the curative is reactive with the epoxy compound to form a cured epoxy product.

20. The method of claim 19, wherein the method further comprises the step of mixing a decomplexing agent with the epoxy compound and the complex of cucurbituril with a curative.

* * * * *